US012766426B2

(12) United States Patent
Knudson et al.

(10) Patent No.: US 12,766,426 B2
(45) Date of Patent: Oct. 20, 2026

(54) FACILITATING COMMUNICATION BETWEEN COMPUTING PLATFORMS

(71) Applicant: Electronic Arts Inc., Redwood City, CA (US)

(72) Inventors: Peter Knudson, New York City, NY (US); Eamonn Burke, Donabate (IE); David Banse, San Francisco, CA (US); Michael Joseph DeLeon, Debary, FL (US); Christopher Liu, Toronto (CA); Tomas Jogin, Uppsala (SE); Joseph Traverso, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 258 days.

(21) Appl. No.: 18/593,619

(22) Filed: Mar. 1, 2024

(65) Prior Publication Data

US 2025/0276249 A1 Sep. 4, 2025

(51) Int. Cl.
*A63F 13/87* (2014.01)

(52) U.S. Cl.
CPC .................................... *A63F 13/87* (2014.09)

(58) Field of Classification Search
CPC ................................ A63F 13/87; A63F 13/35
See application file for complete search history.

(56) References Cited

U.S. PATENT DOCUMENTS

| | | | | |
|---|---|---|---|---|
| 6,415,317 | B1 * | 7/2002 | Yelon | A63F 13/30 719/329 |
| 7,244,181 | B2 * | 7/2007 | Wang | G06Q 30/00 463/42 |
| 8,678,929 | B1 * | 3/2014 | Nishimura | A63F 13/798 463/31 |
| 9,381,432 | B2 * | 7/2016 | Justice | A63F 13/355 |
| 9,578,094 | B1 * | 2/2017 | Ranade | G06Q 50/01 |
| 9,674,267 | B2 * | 6/2017 | Fiedler | A63F 13/358 |
| 10,628,294 | B2 * | 4/2020 | Datta | G06F 11/3698 |
| 11,033,813 | B2 * | 6/2021 | Brown | A63F 13/71 |
| 2002/0142843 | A1 * | 10/2002 | Roelofs | A63F 13/31 463/42 |

(Continued)

*Primary Examiner* — Chase E Leichliter
(74) *Attorney, Agent, or Firm* — McDermott Will & Schulte LLP

(57) ABSTRACT

Facilitating communication between computing platforms, including establishing, via a game agnostic communication service (GACS), communication with a first and a second computing platform; receiving i) first game state data associated with a first video game application executing at the first computing platform and ii) second game state data associated with a second video game application executing at the second computing platform; receiving a request to display at the first computing platform a first communication interface of the GACS; generating content for the first communication interface based at least in part on the first or the second game state data; causing to display the generated content via the first communication interface; receiving selection of one of the communication messages to transmit to the second computing platform; transmitting the selected communication message to the second computing platform for display via a second communication interface of the GACS at the second computing platform.

20 Claims, 11 Drawing Sheets

(56) References Cited

U.S. PATENT DOCUMENTS

| | | | | |
|---|---|---|---|---|
| 2010/0083286 | A1* | 4/2010 | Herring | A63F 13/45 719/328 |
| 2016/0001184 | A1* | 1/2016 | Sepulveda | A63F 13/60 463/31 |
| 2016/0001187 | A1* | 1/2016 | Sepulveda | A63F 13/49 463/31 |
| 2016/0330493 | A1* | 11/2016 | Chuah | H04N 21/637 |
| 2017/0264681 | A1* | 9/2017 | Apte | H04W 12/08 |
| 2019/0388792 | A1* | 12/2019 | Goslin | A63F 13/537 |
| 2021/0046384 | A1* | 2/2021 | Kurabayashi | A63F 13/23 |
| 2021/0146241 | A1* | 5/2021 | Bleasdale-Shepherd | G06N 20/00 |
| 2023/0082388 | A1* | 3/2023 | Lu | A63F 13/25 463/42 |
| 2025/0121290 | A1* | 4/2025 | Gould | A63F 13/23 |
| 2025/0276249 | A1* | 9/2025 | Knudson | A63F 13/87 |

* cited by examiner

FACILITATING COMMUNICATION BETWEEN COMPUTING PLATFORMS

BACKGROUND

Field of the Disclosure

The disclosure relates generally to computing platforms, and in particular, facilitating communication between computing platforms.

Description of the Related Art

Some video games are designed to enable multiple players to play an instance of the video game together. Many of these multiplayer video games include functionality that enables the players to communicate with each other while they play the video game. Often, this communication takes the form of textual communication, which may be referred to as chat. For instance, one player may type a message using a keyboard and send this message to a particular player or to all other players who are playing the video game with the player that wrote the message.

SUMMARY

Innovative aspects of the subject matter described in this specification may be embodied in a method of facilitating communication between computing platforms, including establishing, over a network and via a game agnostic communication service, communication with a first computing platform and a second computing platform; receiving first game state data associated with a first video game application executing at the first computing platform; receiving second game state data associated with a second video game application executing at the second computing platform; receiving a request to display at the first computing platform a first communication interface of the game agnostic communication service, the first communication interface including one or more interactable graphical elements; generating content for the first communication interface to be displayed at the first computing platform, the content being generated based at least in part on the first game state data or the second game state data, wherein the content to be displayed includes communication messages corresponding to each of the one or more interactable graphical elements, wherein each of the communication messages comprise a function associated with the first video game application or the second video game application; causing to display the generated content via the first communication interface of the first computing platform; receiving a selection of one of the communication messages displayed via the first communication interface of the first computing platform to transmit to the second computing platform; and transmitting the selected communication message to the second computing platform for display via a second communication interface of the game agnostic communication service at the second computing platform.

Other embodiments of these aspects include corresponding systems, apparatus, and computer programs, configured to perform the actions of the methods, encoded on computer storage devices.

These and other embodiments may each optionally include one or more of the following features. For instance, generating the content to be displayed is based at least in part on the type of platforms of the first computing platform and second computing platform. Both the first video game application and the second video game application are of the same video game application. The first video game application is of a first type of video game application and the second video game application is of a second type of video game application differing from the first type of video game application. Translating the selected communication message from a first format associated with the first computing platform to a second format associated with the second computing platform; and displaying the translated selected communication message via the second communication interface of the second computing platform. Translating the selected communication message includes translating the selected communication message based on one or more user settings of the second computing platform. The user settings include accessibility settings, language settings, or both. Generating the content to be displayed is also based on one or more settings from at least the first video game application or the second video game application. The first computing platform is of a first type of gaming platform and the second computing platform is of a second type of gaming platform, the first type of gaming platform differing from the second type of gaming platform. Instantiating the first communication interface at the first computing platform by the first video game application.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
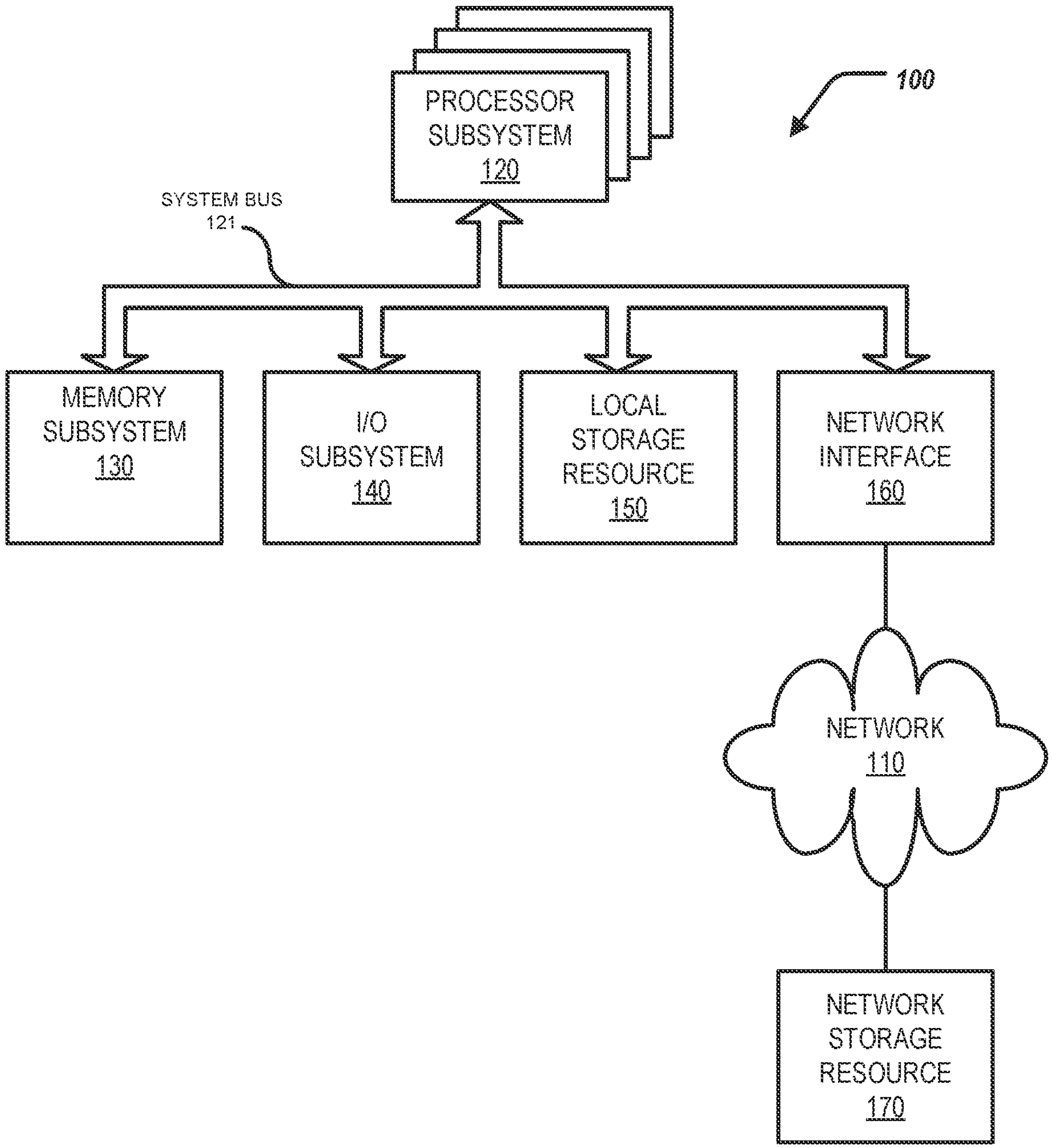
FIG. 1 is a block diagram of selected elements of an embodiment of a computing platform.

This disclosure discusses methods and systems for facilitating communication between computing platforms. In short, messaging between computing platforms can include "quick messaging systems" that can provide efficient communication. The "quick messaging system" can be i) agnostic to any application (e.g., game) executing at the computing platforms and ii) platform agnostic. Additionally, the "quick messaging system" can leverage data and functions (state and telemetry data) from the applications and platforms to streamline communication functions, described further herein.

Specifically, this disclosure discusses a system and a method for establishing, over a network and via a game agnostic communication service, communication with a first computing platform and a second computing platform; receiving first game state data associated with a first video game application executing at the first computing platform;

receiving second game state data associated with a second video game application executing at the second computing platform; receiving a request to display at the first computing platform a first communication interface of the game agnostic communication service, the first communication interface including one or more interactable graphical elements; generating content for the first communication interface to be displayed at the first computing platform, the content being generated based at least in part on the first game state data or the second game state data, wherein the content to be displayed includes communication messages corresponding to each of the one or more interactable graphical elements, wherein each of the communication messages comprise a function associated with the first video game application or the second video game application; causing to display the generated content via the first communication interface of the first computing platform; receiving a selection of one of the communication messages displayed via the first communication interface of the first computing platform to transmit to the second computing platform; and transmitting the selected communication message to the second computing platform for display via a second communication interface of the game agnostic communication service at the second computing platform.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, a computing platform may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, a computing platform may be a personal computer, a PDA, a consumer electronic device, a network storage device, or another suitable device and may vary in size, shape, performance, functionality, and price. The computing platform may include memory, one or more processing resources such as a central processing unit (CPU) or hardware or software control logic. Additional components of the computing platform may include one or more storage devices, one or more communications ports for communicating with external devices as well as various input and output (I/O) devices, such as a keyboard, a mouse, and a video display. The computing platform may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of a computing platform 100 in accordance with some embodiments of the present disclosure. In various embodiments, computing platform 100 may represent different types of portable computing platforms, such as, display devices, head mounted displays, head mount display systems, smart phones, tablet computers, notebook computers, media players, digital cameras, 2-in-1 tablet-laptop combination computers, and wireless organizers, or other types of portable computing platforms. In one or more embodiments, computing platform 100 may also represent other types of computing platforms, including desktop computers, server systems, controllers, and microcontroller units, among other types of computing platforms. Components of computing platform 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of the computing platform). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated computing platform, such as system 100, is powered down.

In computing platform 100, I/O subsystem 140 may comprise a system, device, or apparatus generally operable to receive and/or transmit data to/from/within computing platform 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between computing platform 100 and a network 110. Network interface 160 may enable computing platform 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from computing platform 100.

In particular embodiments, network 110 may include one or more routers for routing data between client computing platforms 100 and server computing platforms 100. A device (e.g., a client computing platform 100 or a server computing platform 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client computing platforms 100 may communicate with one or more server computing platforms 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
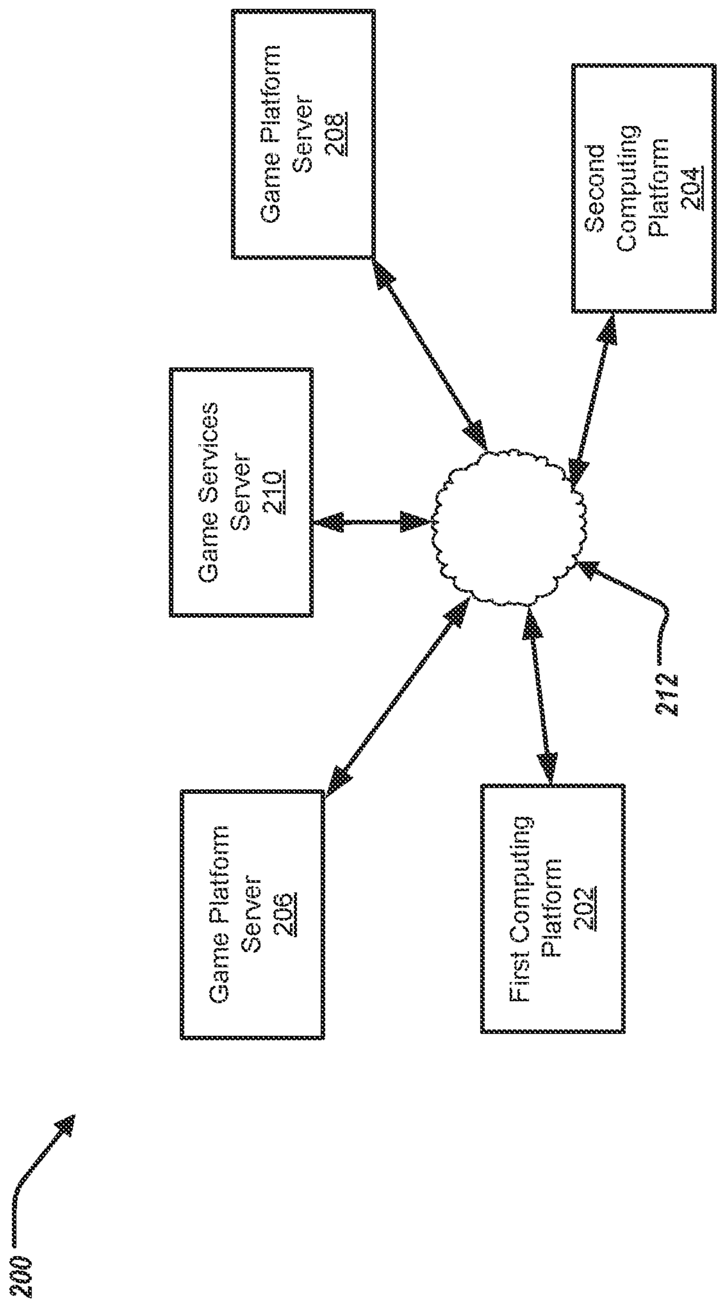
FIGS. 2 and 3 illustrate respective block diagrams of a computing environment including multiple computing platforms, game platform servers, and a game services server.

Turning to FIG. 2, FIG. 2 illustrates an environment 200 including a first computing platform 202, a second computing platform 204, a first game platform server 206, a second game platform server 208, and a game services server 210. In some examples, the computing platforms 202, 204 are each similar to, or include, the computing platform 100 of FIG. 1. In some examples, the game platform servers 206, 208 and the game services server 210 are similar to, or include, the computing platform 100 of FIG. 1. The environment 200 can include any number of computing platforms, e.g., two or more computing platforms. The environment 200 can include any number of game services servers 210.

The computing platforms 202, 204 can be in communication with the game platform servers 206, 208, respectively, and the game services server 210 over a network 212 (e.g., the "cloud" or the Internet). In some examples, the game platform servers 206, 208 are in communication with the game services server 210.

In some examples, the first computing platform 202 is the same as the second computing platform 204. That is, a type (model, or manufacturer) of platform of the first computing platform 202 is the same as the type (model, or manufacturer) of platform of the second computing platform 204. In some examples, the first computing platform 202 differs from the second computing platform 204. That is, a type (model, or manufacturer) of platform of the first computing platform 202 differs from the type (model, or manufacturer) of platform of the second computing platform 204.

In short, messaging between the computing platforms 202, 204 via the game services server 210 can include "quick messaging systems" that can provide efficient communication. The "quick messaging system" can be i) agnostic to any application (e.g., game) executing at the computing platforms and ii) platform agnostic. Additionally, the "quick messaging system" can leverage data and functions (state and telemetry data) from the applications and platforms to streamline communication functions, described further herein.

Figure 3:
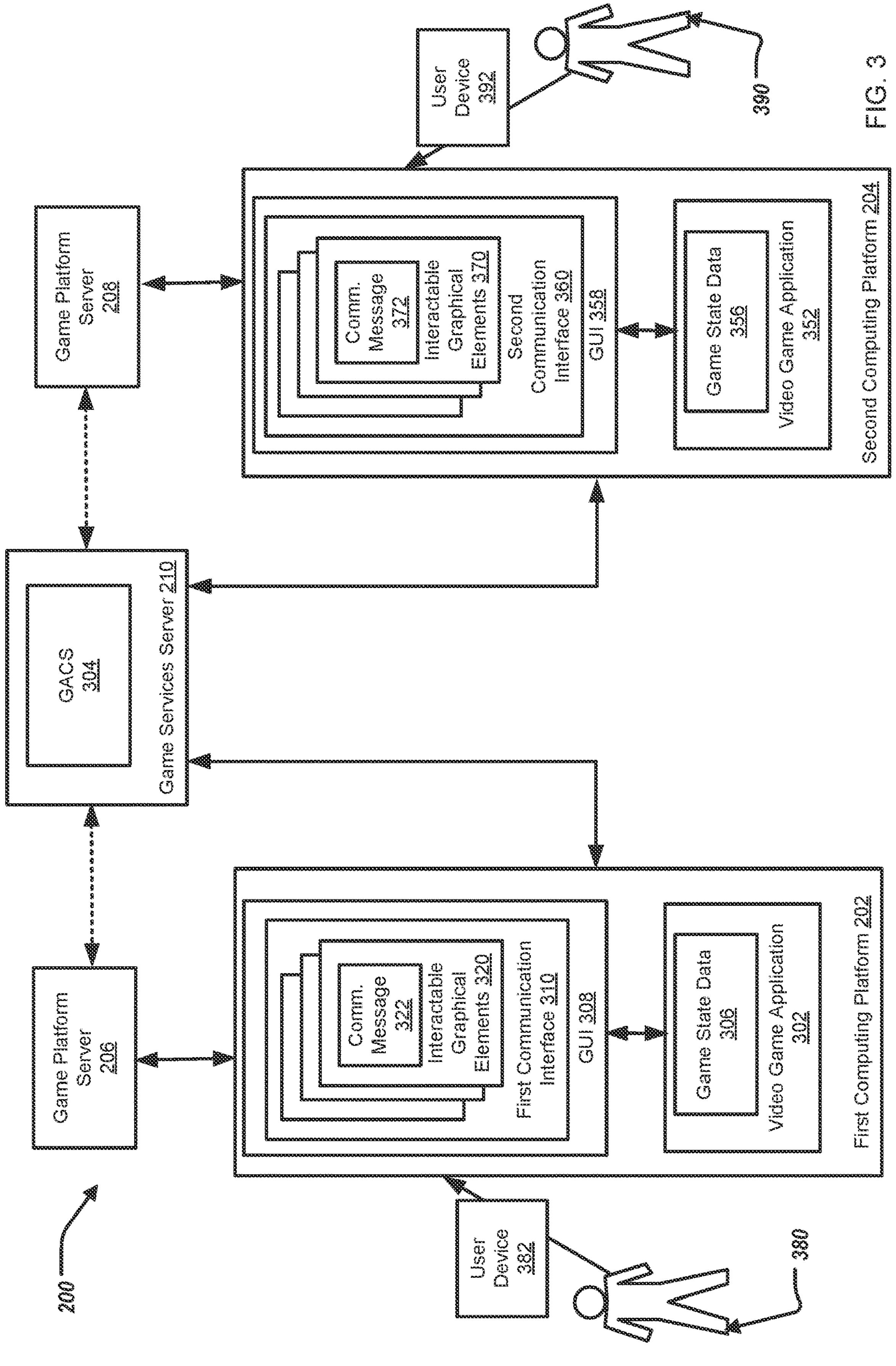

FIG. 3 illustrates a detailed view of the environment 200. Specifically, the first computing platform 202 can include a first video game application 302 and a graphical user interface (GUI) 308. In some examples, the first computing platform 202 is a gaming platform (a first type of a gaming platform—home video console, portable video device, handheld video device, smartphone, or a personal computing device).

A user 380 can interact with the first computing platform 202. For example, the user 380 can interact with the first computing platform 202 via a user device 382. The user device 382 can include any user interactable device that can provide input to the first computing platform 202 (e.g., wired or wireless). For example, the user device 382 is any device that provides tactile input to the first computing platform 202. For example, the user device 382 can include a controller (video game controller).

The second computing platform 204 can include a second video game application 352 and a graphical user interface (GUI) 358. In some examples, the second computing platform 204 is a gaming platform (a second type of a gaming platform—home video console, portable video device, handheld video device, smartphone, or a personal computing device). In some examples, the second type of the gaming platform of the second computing platform 204 can be different than the first type of the gaming platform of the first computing platform 202. In some examples, the second type of the gaming platform of the second computing platform 204 can be the same, or similar, to the first type of the gaming platform of the first computing platform 202.

A user 390 can interact with the second computing platform 204. For example, the user 390 can interact with the second computing platform 204 via a user device 392. The user device 392 can include any user interactable device that can provide input to the second computing platform 204 (e.g., wired or wireless). For example, the user device 392 is any device that provides tactile input to the second computing platform 204. For example, the user device 392 can include a controller (video game controller). In some examples, the user device 392 is the same as the user device 382 (a type of the user device 392 is the same as a type of the user device 382). In some examples, the user device 392 differs from the user device 382 (a type of the user device 392 differs from a type of the user device 382).

In some examples, the first video game application 302 and the second video game application 352 are the same, or substantially the same, video game applications (or online video game applications). That is, the first video game application 302 and the second video game application 352 are the same with the first video game application 302 being deployed at the first computing platform 202 and the second video game application 352 being deployed at the second computing platform 204.

In some examples, the first video game application 302 and the second video game application 352 are different video game applications (or online video game applications), or differing types of video game applications (or online video game applications). That is, the first video game application 302 and the second video game application 352 are different types with the first video game application 302 being deployed at the first computing platform 202 and the second video game application 352 being deployed at the second computing platform 204.

The first computing platform 202 can be in communication with the first game platform server 206. The first game platform server 206 can facilitate execution of the first video game application 302 at the first computing platform 202. For example, the first game platform server 206 can perform such functions as authentication of the user 380, including determining whether the user 380 is associated with a valid user account, a status of such user account (e.g., active, or banned), permissions associated with the user account, and the like. For example, the first game platform server 206 can perform such functions as player networking to identify social online relationships with other users. For example, the first game server platform 206 can perform such functions as matchmaking to group together users during group play of the first video game application 302. For example, the first game platform server 206 can perform such functions as game management to host the online execution of the first video game application 302.

The second computing platform 204 can be in communication with the second game platform server 208. The second game platform server 208 can facilitate execution of the second video game application 352 at the second computing platform 304. For example, the second game platform server 208 can perform such functions as authentication of the user 390, including determining whether the user 390 is associated with a valid user account, a status of such user account (e.g., active, or banned), permissions associated with the user account, and the like. For example, the second game platform server 208 can perform such functions as player networking to identify social online relationships with other users. For example, the second game platform server 208 can perform such functions as matchmaking to group together users during play of the second video game application 352. For example, the second game platform server 208 can perform such functions as game management to host the online execution of the second video game application 352.

The game services server 210 can be in communication with the first computing platform 202 and the second computing platform 204. The game services server 210 can include a game agnostic communication service (GACS) 304. The GACS 304 can facilitate communication between the first computing platform 202 and the second computing platform 204, described further herein. In some examples, the GACS 304 is agnostic to the first video game application 302 and the second video game application 352. That is, the GACS 304 is not specific or correlated to the first video game application 302 or the second video game application 352. The GACS 304 is independent of the first video game application 302 and the second video game application 352, and independent of any particular parameters of the first video game application 302 and the second video game application 352. Furthermore, the GACS 304 is independent of the first computing platform 202 and the second computing platform 204; for example, the GACS 304 is independent of the type of the first computing platform 202 and the second computing platform 204, and/or the technology implemented at the first computing platform 202 and the second computing platform 204.

In some examples, the game services server 210 can represent multiple servers—a distributed computing platform. The GACS 304 can be distributed across any number of game services servers 210.

To that end, the GACS 304 can facilitate communication between the first computing platform 202 and the second computing platform 204, described further herein. Specifically, communication is established (e.g., over the network 212 shown in FIG. 1) between i) the game services server 210 and the first computing platform 202 and between ii) the game services server 210 and the second computing platform 204. Specifically, communication is established between the game services server 210 and the computing platforms 202, 204 via the GACS 204.

The game services server 210, and specifically, the GACS 204, can receive first game state data 306 from the first computing platform 202. In particular, the first video game application 302 can be executing at the first computing platform 202 (e.g., a user 380 is engaging with the video game application 302 via the user device 382). The first computing platform 202 can communicate the first game state data 306 to the game services server 210 (e.g., automatically at predetermined intervals, or in response to a request). The first game state data 306 (or telemetry data 306) can include any state or telemetry data associated with the first video game application 302 and/or execution of the first video game application 302. In some examples, the first game state data 306 can include data indicating a latency of execution of the first video game application 302 with respect to the first game platform server 206.

The game services server 210, and specifically, the GACS 204, can receive second game state data 356 from the second computing platform 204. In particular, the second video game application 352 can be executing at the second computing platform 204 (e.g., a user 390 is engaging with the video game application 302 via the user device 392). The second computing platform 204 can communicate the second game state data 356 to the game services server 210 (e.g., automatically at predetermined intervals, or in response to a request). The second game state data 356 (or telemetry data 356) can include any state or telemetry data associated with the second video game application 352 and/or execution of the second video game application 352. In some examples, the second game state data 356 can include data indicating a latency of execution of the second video game application 352 with respect to the second game platform server 208.

The game services server 210, and specifically, the GACS 304, can receive a request to display at the first computing platform 202 a first communication interface 310 of the GACS 304 at the GUI 308 of the first computing platform 202. That is, the first communication interface 310 is an instance (at least partially) of the GACS 304 at the first computing platform 202. That is, the first computing platform 202 can instantiate the instance of the GACS 304 at the first computing platform 202 as the first communication interface 310. The first communication interface 310 can include interactable graphical elements 320. The interactable graphical elements 320 can include graphical elements that allow or enable user interaction with them—e.g., through control input through the user device 382.

Figure 4A:
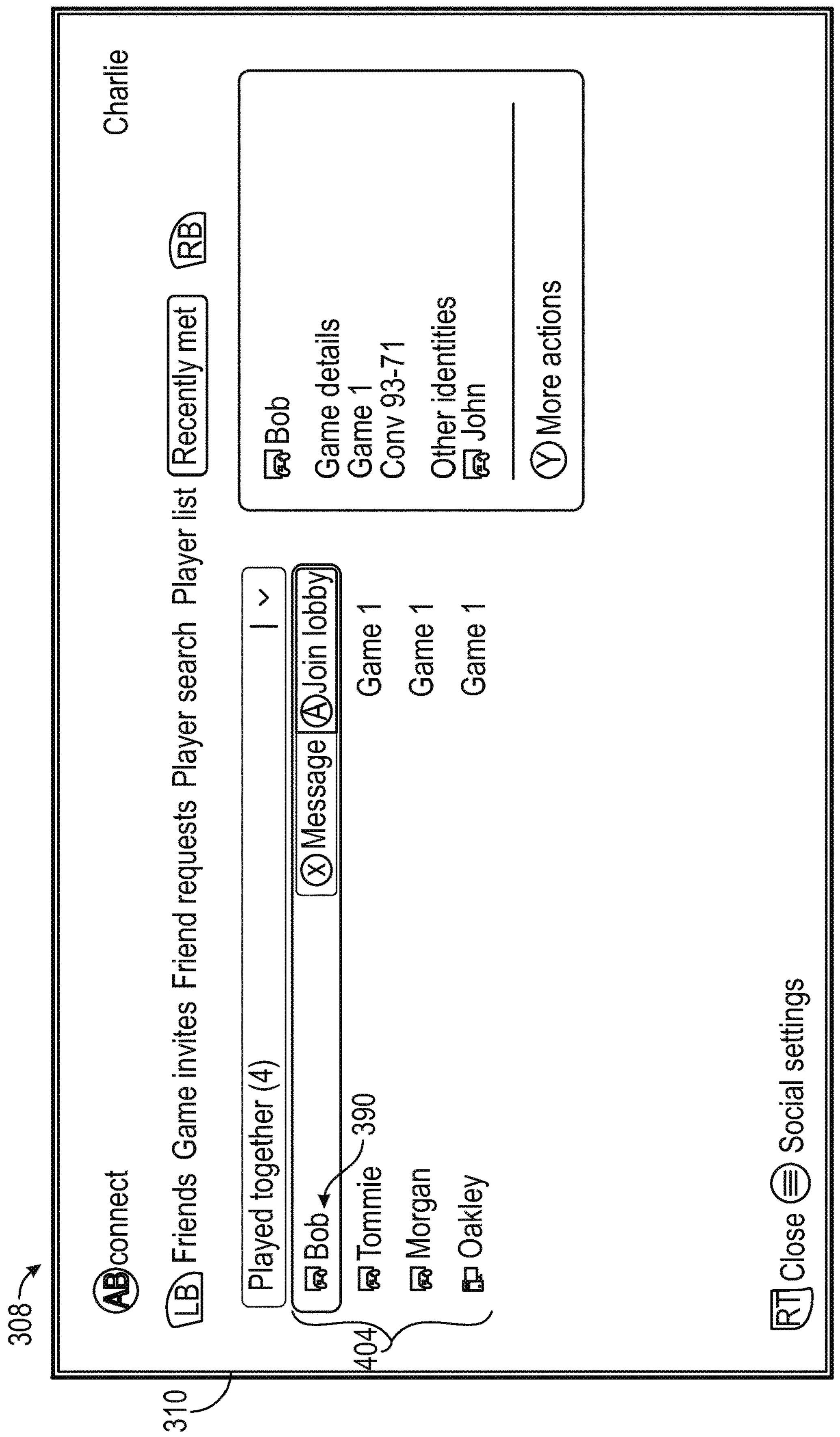
FIGS. 4A-4C illustrate respective graphical user interfaces at a computing platform.

The first computing platform 202 receives user input. In some examples, the first computing platform 202 receives the user input from the user 380 via the user device 382. The user input can indicate a surfacing of the first communication interface 310 at the GUI 308. FIG. 4A illustrates the GUI 308 including the first communication interface 310 surfaced at the GUI 308. Additionally, the GUI 380 illustrates that the user 380 has provided additional user input (via the user device 382) selecting the user 390 ("Bob") from the list of users 404 socially connected to the user 380.

Referring back to FIG. 3, the GACS 304 can generate content for the first communication interface 310. In some examples, the GACS 304 can generate the content in response to receiving the user input indicating the surfacing of the first communication interface 310. The GACS 304 can generate the content based on the first state data 306 and the second state data 356. Specifically, the GACS 304 can generate the content to be displayed at the first computing platform 202 to include communication messages 322 corresponding to each of the interactable graphical elements 320. In some examples, the GACS 304 can generate the communications messages 322 based on the first state data 306 and/or the second state data 356. Additionally, the GACS 304 can generate the communication messages 322 based on one or more parameters. For example, the parameters can include a type of the first computing platform 202 and/or a type of the second computing platform 204; a type of the first video game application 302 (racing, sports, trivia, etc.); an online status of other users socially connected to the user 380 (e.g., through the GACS 304), including, for example, an online status of the user 390; the relationship status of the others users socially connected to the user 380 through the GACS 304, including, for example, the relationship status of the user 390; an interaction history of the user 380 with the other users socially connected to the user 380, including for example, the interaction history between the user 380 and the user 390; a recent interaction history of the user 380 with the other users socially connected to the user 380, including, for example, a recent interaction history between the user 380 and the user 390; a video game application currently being played by the other users socially connected with the user 380 including, for example, the video game application the user 390 is currently playing; among other parameters. In some examples, the GACS 304 can generate the communication messages 322 based on a message history of the user 380 with respect to the other users socially connected to the user 380, including, for example the user 390. In some examples, the communication messages 322 can be agnostic to the first video game application 302, the second video game application 352, or both.

In some examples, the GACS 304 can generate the communications messages 322 based on the first state data 306 and the second state data 356 utilizing machine learning (ML), and/or using a neural network.

Figure 4B:
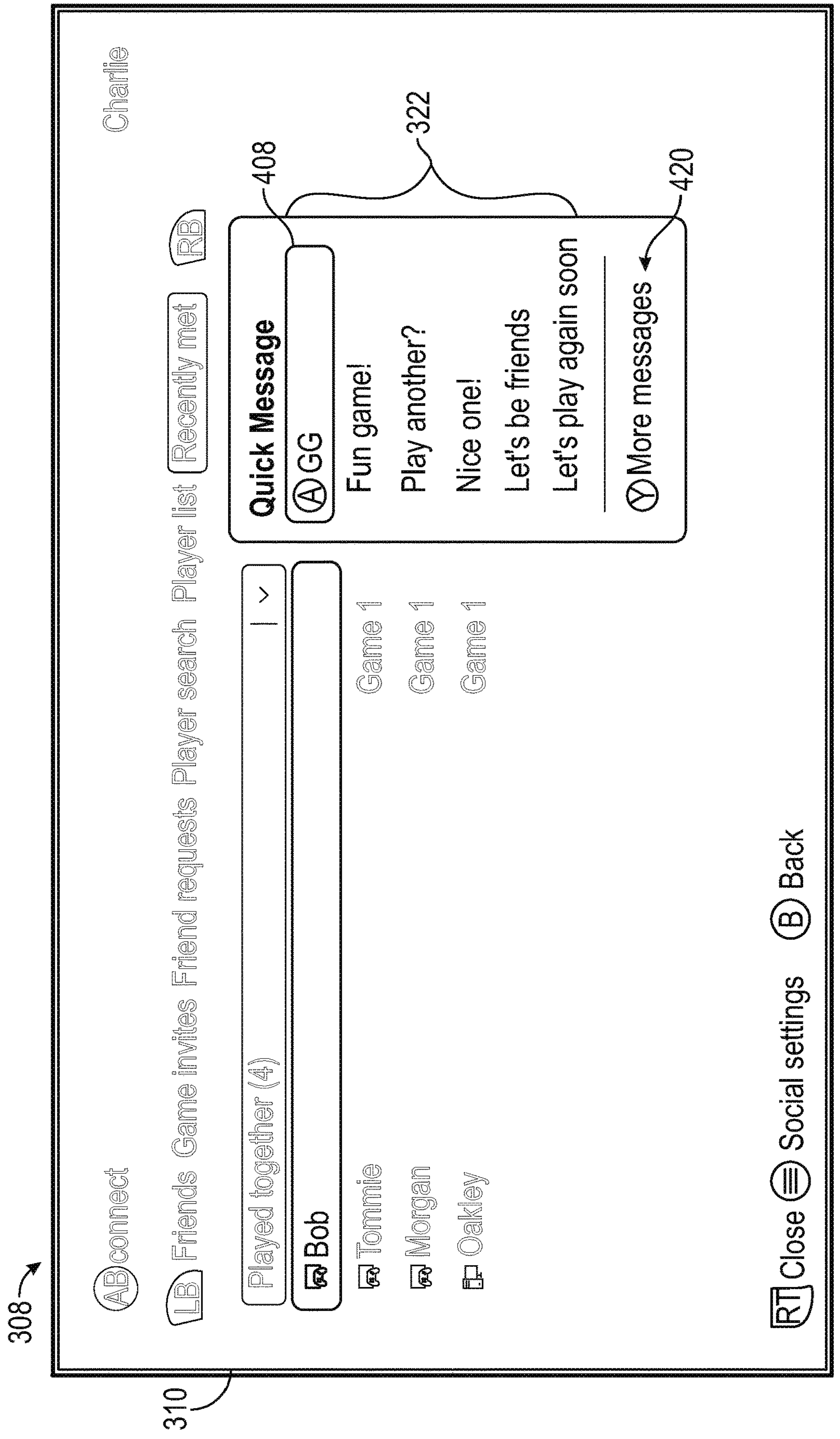

The GACS 304 can cause to display the generated content via the first communication interface 310 of the first computing platform 302. That is, the GACS 304 can cause to display the communication messages 322 at the first communication interface 310 of the first computing platform 302. Specifically, the GACS 304 can populate the first communication interface 310 with the communication messages 322. FIG. 4B illustrates the first communication interface 310 populated with the communication messages 322.

Referring back to FIG. 3, the GACS 304 receives data indicating a selection of one of the communication messages 322 displayed via the first communication interface 310 of the first computing platform 202 to transmit to the second computing platform 204. Specifically, the GACS 304 receives further user input through the first communication interface 310. In some examples, the first computing platform 202 receives the further user input from the user 380 via the user device 382. The user input can indicate a selection of a particular communication message 322 of the communication messages 322. FIG. 4B illustrates the first communication interface 310 indicating the selection of the particular communication message 408 of the communication messages 322. For example, the particular communication message 408 indicates "GG."

Figure 4C:
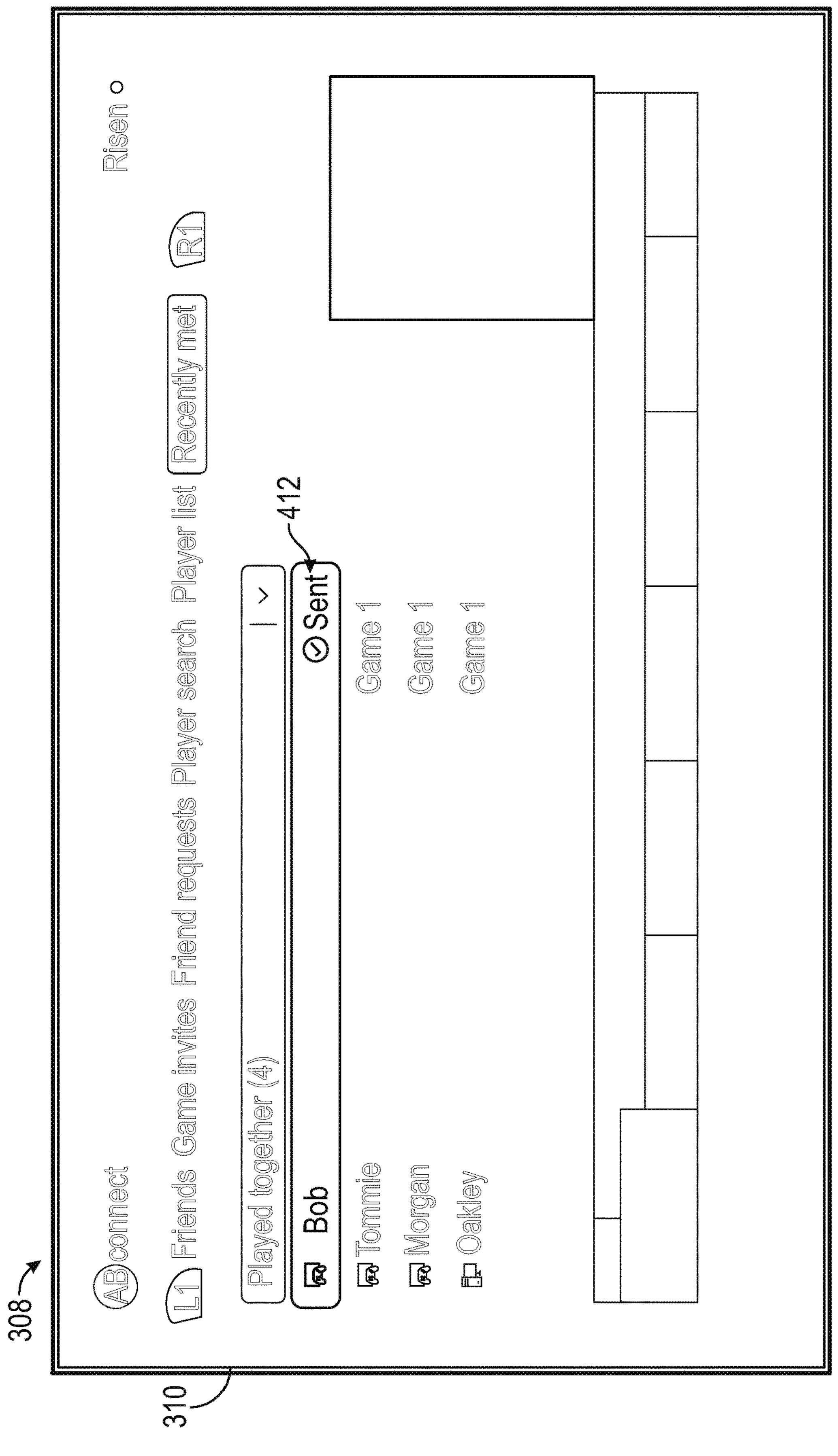

The game services server 210, and in particular, the GACS 304, transmits the particular communication message 322 to the second computing platform 204. For example, the game services server 210, and in particular, the GACS 304, transmits the particular communication message 408 to the second computing platform 204. FIG. 4C illustrates the first communication interface 310 indicating that the particular communication message 408 (shown in FIG. 4B) was transmitted to the second computing platform 204—shown by the element 412 ("Sent").

Referring back to FIG. 3, the second computing platform 204 receives the particular communication message 322 from the game services server 210, and in particular, the GACS 304. For example, the second computing platform 204 receives the particular communication message 408.

The game services server 210, and specifically, the GACS 304, can cause to display at the second computing platform 204 a second communication interface 360 of the GACS 304 at the GUI 358 of the second computing platform 204. That is, the second communication interface 360 is an instance (at least partially) of the GACS 304 at the second computing platform 204. That is, the second computing platform 204 can instantiate the instance of the GACS 304 at the second computing platform 204 as the second communication interface 360.

The second communication interface 360 can include interactable graphical elements 370. The interactable graphical elements 370 are graphical elements that allow or enable user interaction with them—e.g., through control input through the user device 382.

Figure 5A:
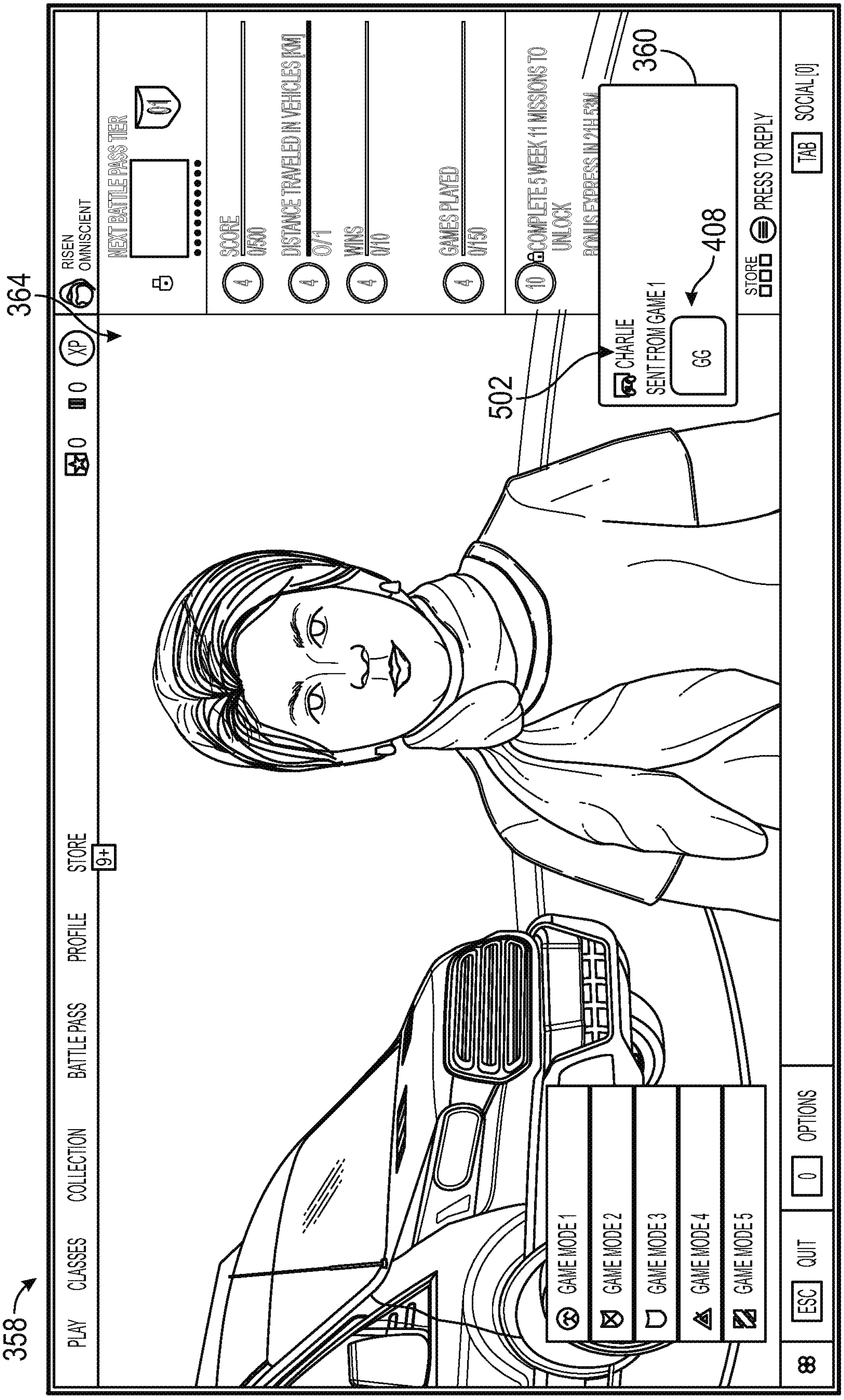
FIGS. 5A-5C illustrate respective graphical user interfaces at a computing platform.

To that end, the GACS 320 can generate the second communication interface 360 to include the particular communication message 322. Specifically, the GACS 320 can overlay the second communication interface 360 in the foreground of the GUI 358 of the second computing platform 204. That is, the GUI 358 can include an online game interface, and the GACS 320 can overlay the second communication interface 360 in the foreground of the GUI 358 while concurrently displaying the online game interface in the background of the GUI 358. FIG. 5A illustrates the GUI 358 of the second computing platform 204 displaying an online game interface 364 in the background of the GUI 358 with the second communication interface 360 overlayed over the online game interface 364 and displayed in the foreground of the GUI 358 (i.e., the second communication interface 360 is "layered" on top of the online game interface 364). In particular, the second communication interface 360 includes the particular communication message 408 (e.g., "GG"). The second communication interface 360 can further indicate a source 502 (e.g., the connected user) of the particular communication message 408.

Referring back to FIG. 3, in some examples, the GACS 304 can translate, after receiving the particular communication message 322, the particular communication message 322 from a first format associated with the first computing platform 202 to a second format associated with the second computing platform 204. The GACS 304 can generate the second communication interface 360 to include the particular communication message 322 in the translated form (e.g., the particular communication message in the second format). In some examples, the first format of the first computing platform 202 can be based on preferences of the user 380 (user settings of the first computing platform 202), and the second format of the second computing platform 204 can based on preferences of the user 390 (user settings of the second computing platform 204).

In some examples, the GACS 304 can translate the communications messages 322 utilizing machine learning (ML), and/or using a neural network.

In some examples, the user settings of the first computing platform 202 can include first language settings; and the user settings of the second computing platform 204 can include second language settings (differing form the first language settings). For example, the first format of the first computing platform 202 can include a particular language, or dialect, and the second format of the second computing platform 204 can include a differing language, or different dialect than that of the first format. The GACS 304 can translate the language of the first format of the particular communication message to the language of the second format that is associated with the second computing platform 204.

In some examples, the user settings of the first computing platform 202 can include first accessibility settings; and the user settings of the second computing platform 204 can include second accessibility settings (differing from the first accessibility settings). For example, the accessibility settings can include vision-based settings. For example, the second user 390 may have low vision, and the second user 390 can adjust the second accessibility settings associated with the second computing platform 204 based on such—the second user 390 can adjust the second accessibility settings to indicate translation of text-based messages (the particular communication message) to icon-based messages.

In response to the GACS 320 generating the second communication interface 360 to include the particular communication message 322, the second computing platform 204 receives user input. In some examples, the second computing platform 204 receives the user input from the user 390 via the user device 392. The user input can indicate a reply to the particular communication message 322. For example, the user input can include an interaction with the second communication interface 360—the user 390 providing input at/via the second communication interface 360.

The GACS 304 can generate further content for the second communication interface 360. In some examples, the GACS 304 can generate the further content in response to receiving the user input indicating the reply to the particular communication message 322.

The GACS 304 can generate the further content based on the first state data 306 and the second state data 356. Specifically, the GACS 304 can generate the further content to be displayed at the second computing platform 204 to include the communication messages 372 corresponding to each of the interactable elements 370. In some examples, the GACS 304 can generate the further communications messages 372 based the first state data 306 and the second state data 356. Additionally, the GACS 304 can generate the further communication messages 372 based on one or more parameters. For example, the parameters can include a type of the first computing platform 202 and/or a type of the second computing platform 204; a type of the first video game application 302 (racing, sports, trivia, etc.); an online status of the others users socially connected to the user 390 (e.g., through the GACS 304), including, for example, an online status of the user 380; the relationship status of the other users socially connected to the user 390 through the GACS 304, including, for example, the relationship status of the user 380; an interaction history of the user 390 with the other users socially connected to the user 390, including for example, the interaction history between the user 390 and the user 380; a recent interaction history of the user 390 with the others users socially connected to the user 390, including, for example, a recent interaction history between the user 390 and the user 380; a video game application currently being played by the other users socially connected with the user 390 including, for example, the video game application the user 380 is currently playing; among other parameters. In some examples, the GACS 304 can generate the further communication messages 372 based on a message history of the user 390 with respect to the other users socially connected to the user 390, including, for example the user 380. In some examples, the further communication messages 372 can be agnostic to the first video game application 302, the second video game application 352, or both.

In some examples, the GACS 304 can generate the further communications messages 372 based on the first state data 306 and the second state data 356 utilizing machine learning (ML), and/or using a neural network.

Figure 5B:
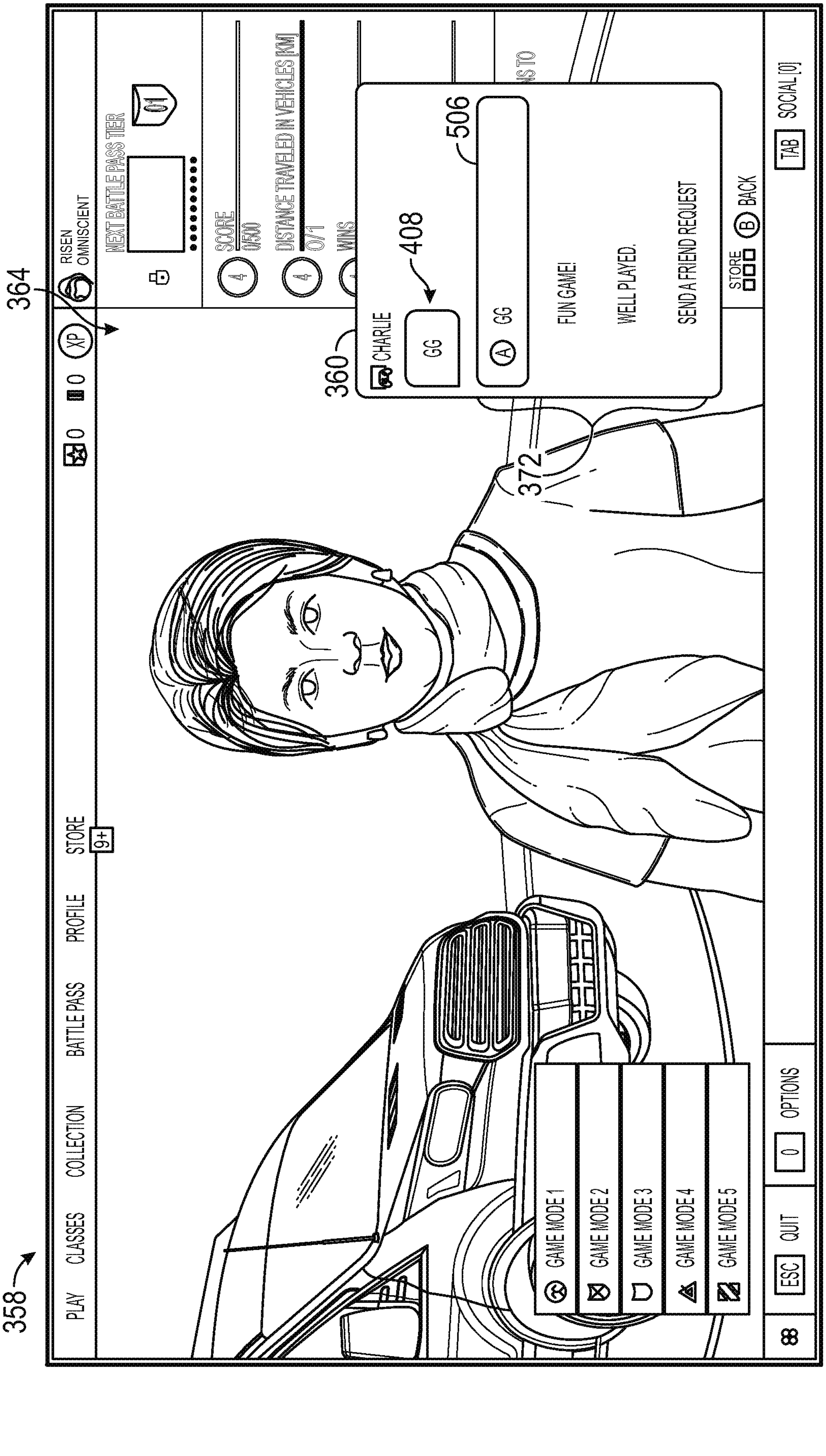

The GACS 304 can cause to display the generated further content via the second communication interface 360 of the second computing platform 204. That is, the GACS 304 can cause to display the further communication messages 372 at the second communication interface 360 of the second computing platform 204. Specifically, the GACS 304 can expand the second communication interface 360. FIG. 5B illustrates the GUI 358 including the second communication interface 360 in an expanded format (expanded second communication interface 360). Further, the GACS 304 can populate the expanded second communication interface 360 with the further communication messages 372. In some examples, the GACS 304 expands the second communication interface 360 and populates the second communication interface 360 with the further communication messages 372 in response to receiving user input from the user 390 via the user device 392.

Figure 5C:
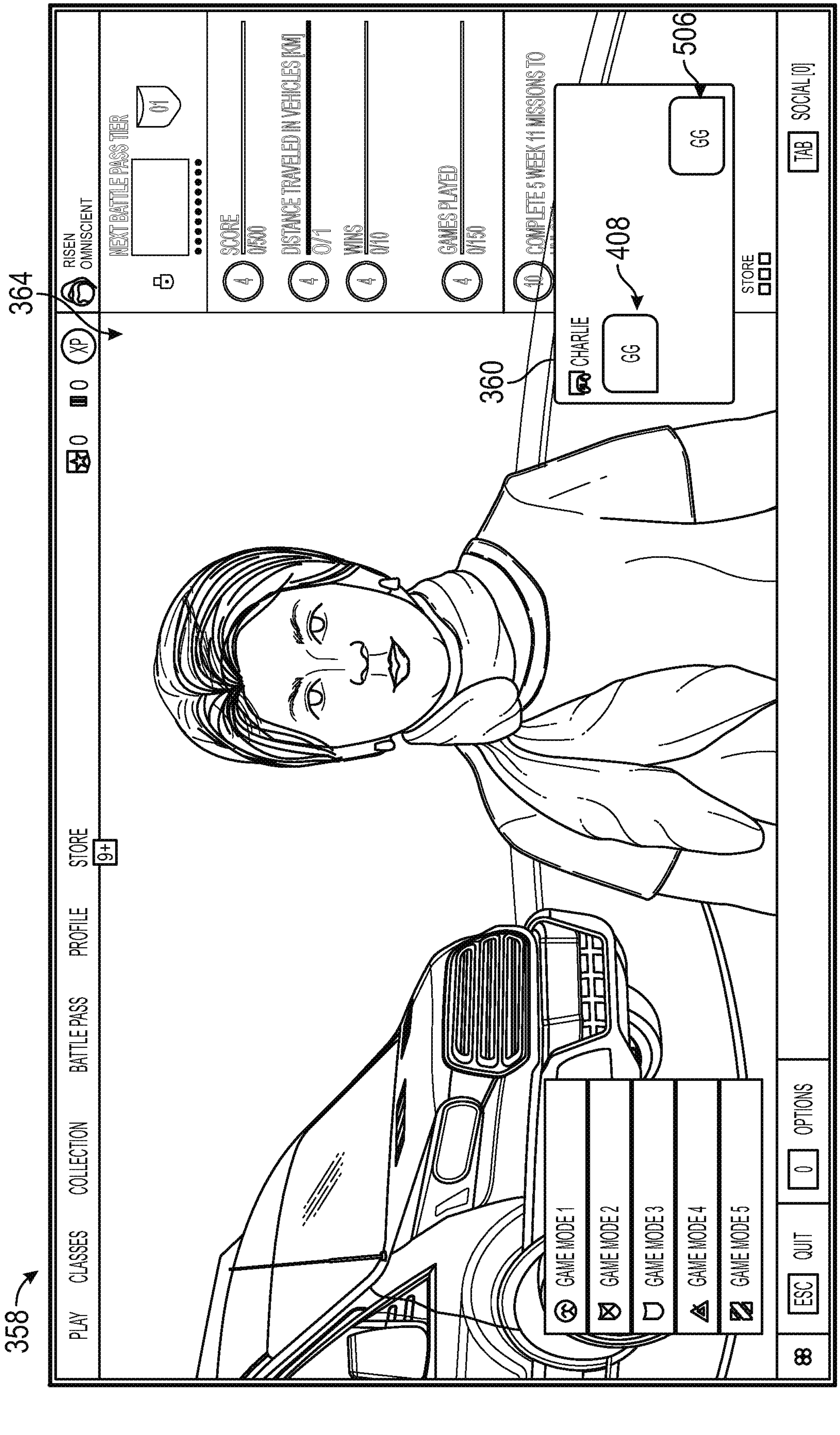

Referring back to FIG. 3, the GACS 304 receives data indicating a selection of one of the further communication messages 372 via the second communication interface 360 of the second computing platform 304 to transmit to the first computing platform 202. Specifically, the GACS 304 receives user input through the expanded second communication interface 360. In some examples, the second computing platform 204 receives the further user input from the user 390 via the user device 392. The user input can indicate a selection of a further communication message 372 of the further communication messages 372. FIG. 5C illustrates the second communication interface 360 indicating the selection of the further particular communication message 506 of the further communication messages 372. For example, the further particular communication message 506 indicates "GG."

Referring back to FIG. 3, the game services server 210, and in particular, the GACS 304, transmits the further particular communication message 372 to the first computing platform 202. For example, the game services server 210, and in particular, the GACS 304, transmits the further particular communication message 372 to the first computing platform 202.

The first computing platform 202 receives the further particular communication message 372 from the game services server 210, and in particular the GACS 304. For example, the first computing platform 202 receives the further particular communication message 506.

The GACS 304 can update the first communication interface 310 to include the further particular communication message. In some examples, the GACS 304 updates the first communication interface 310 in response to receiving the selection of the further particular communication message 372 from the second computing platform 204. Specifically, the GACS 304 can update the first communication interface 310 to overlay the first communication interface 310 in the foreground of the GUI 308 of the first computing platform 202 (or a portion of the first communication interface 310 to overlay in the foreground of the GUI 308). That is, in some examples, the GUI 308 can include an online game interface. The GACS 304 can overlay the first communication interface 310 in the foreground of the GUI 308 while concurrently displaying the online game interface in the background of the GUI 308.

In some examples, the GACS 304 updates the second communication interface 360 to include the further particular communication message 372. For example, referring to FIG. 5B, the second communication interface 360 is updated to include the further particular communication message 506.

To that end, by having the second communication interface 360 overlaying the online game interface 364, the user 390 is able to receive and reply to messages (notifications, chats) without having to open a full screen communication interface at the GUI 358. This can provide a more efficient use of memory of the second computing platform 204, e.g., during gameplay of the first online game module 354 through the online game interface 364.

Figure 6:
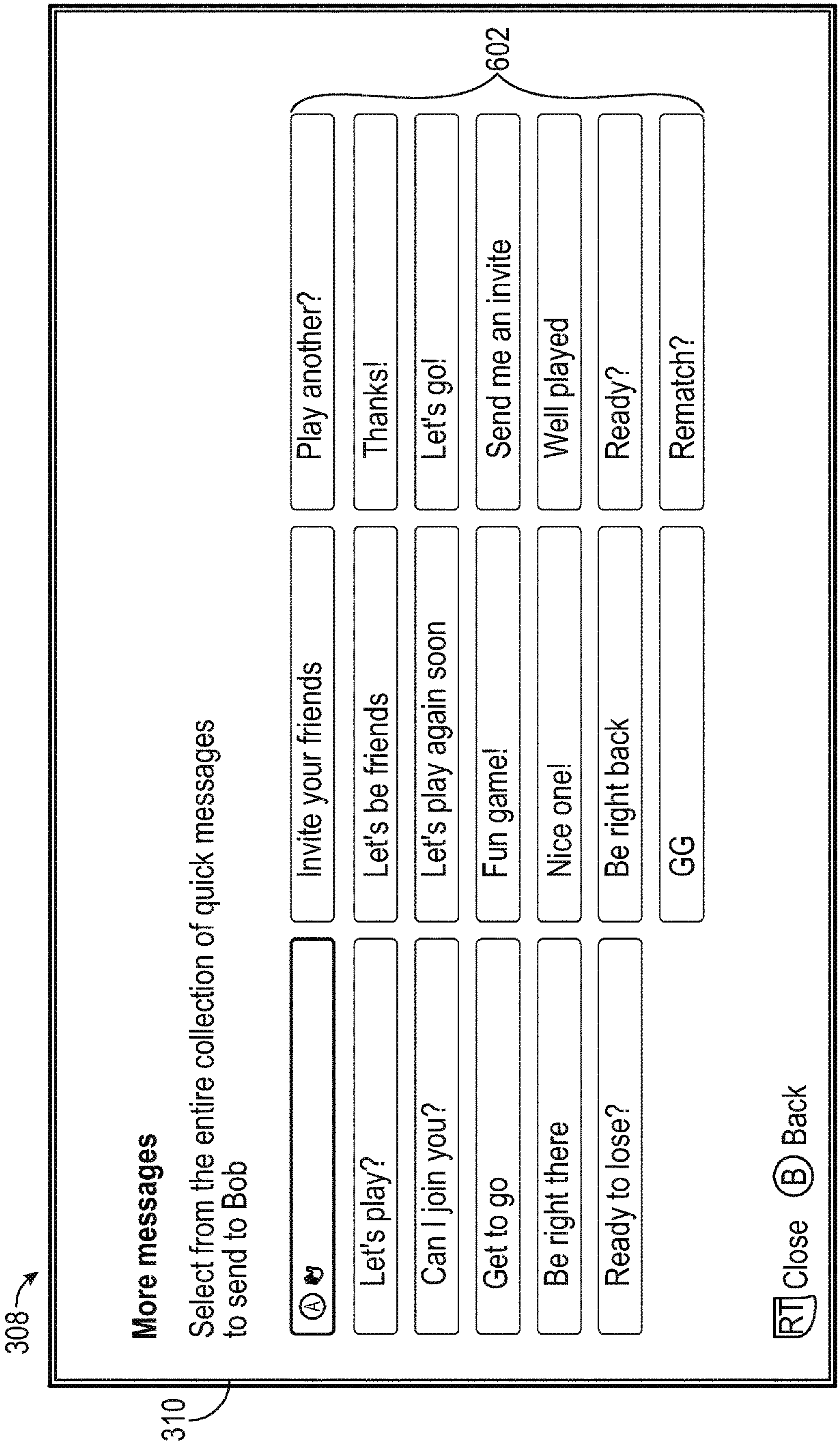
FIG. 6 illustrates a graphical user interface at a computing platform.

As noted above, the GACS 304 can generate the communication messages 322 for display on the first communication interface 310 at the first computing platform 202. Specifically, referring to FIG. 4B, the first communication interface 310 can include an element 420, such that when "selected" by the user 380 via the user device 382, the GACS 304 can update the first communication interface 310, as shown in FIG. 6, to include the additional communication messages 602. The GACS 304 can receive the further user input indicating a selection of the particular communication message of the additional communication messages 602.

In some examples, the particular communication message 322 that is transmitted to the second computing platform 204 (by the GACS 304) can include a function (a computer-implemented action) associated with the first video game application 302 or the second video game application 352. For example, the function can include an invitation of joining interaction with the first video game application 302 and the user 380 at the second competing platform 204. For example, the functionality of inviting the user 390 at the second computing platform 204 to join the user 380 in a video game (e.g., the first video game application 302) can be implemented within the particular communication message 322. This provides efficient and effective transmission of invitations between the first computing platform 202 and the second computing platform 204 (through the GACS 304).

The GACS 304 can provide the particular communication message 322 to the second computing platform 204, as described above, with the particular communication message 322 including the function associated with a computer-implemented action of the first video game application 302.

The second computing platform 204 can receive the particular communication message 322 from the GACS 304, as described herein. In response to receiving the particular communication message 322 with the function, the GACS 304 can update the second communication interface 360 to include the particular communication message 322 with the function. In particular, the particular communication message 322 that is displayed at the second communication interface 360 can include the functionality indicating their acceptance to join interaction with the second video game application 352 at the second computing platform 204 and functionality indicating a declination to join interaction with the second video game application 352 at the second computing platform 204. For example, the particular communication message 322 can include text such as "Invite to Join Party" with a first functionality indicating acceptance of the invite (e.g., "yes") and a second functionality indicating declination of the invite (e.g., "no").

To that end, the functionality of the invitation of joining interaction with the first video game application 302 can be independent, or agnostic, of the first video game application 302. For example, the second computing platform 204 can be implementing/executing a differing video game application than the first video game application 302, and receive the particular communication message including the function of the invitation of joining interaction with the first video game application 302.

In some further examples, the function associated with the first video game application 302 or the second video game application 352 can include joining or leaving a party (e.g., an online multi-person cooperative session of the first video game application 302 or the second video game application 352). In some further examples, the function associated with the first video game application 302 or the second video game application 352 can include providing, accepting, or rejecting a social connection request (e.g., "friend request") between the users 380, 390 through the GACS 304. In some further examples, the function associated with the first video game application 302 or the second video game application 352 can include queuing up for a particular game mode of the video game application 302 or the second video game application 352. In some further examples, the function associated with the first video game application 302 or the second video game application 352 can include leading a particular game of the video game application 302 or the second video game application 352. In some further examples, the function associated with the first video game application 302 or the second video game application 352 can include joining a voice chat associated with the first video game application 302 or the second video game application 352. In some further examples, the function associated with the first video game application 302 or the second video game application 352 can include leaving a party associated with the first video game application 302 or the second video game application 352.

Figure 7:
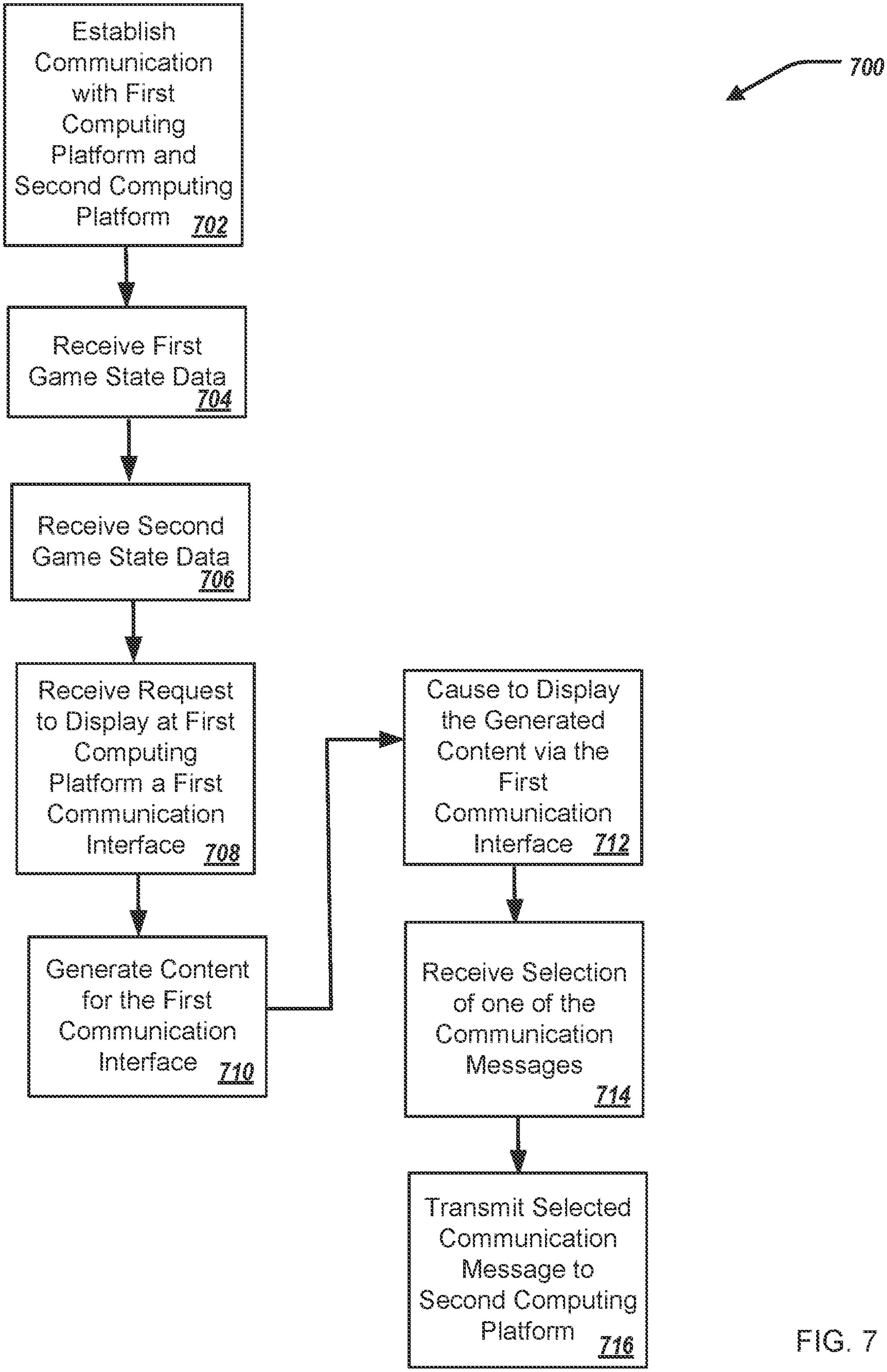
FIG. 7 illustrates a method for facilitating communication between computing platforms.

FIG. 7 illustrates a flowchart depicting selected elements of an embodiment of a method 700 for facilitating communication between computing platforms. The method 700 may be performed by the computing platform 100, the first computing platform 202, the second computing platform 204, and/or the game services server 210, and with reference to FIGS. 1-6. It is noted that certain operations described in method 700 may be optional or may be rearranged in different embodiments.

The GACS 304 establishes, over the network 212, communication with the first computing platform 202 and the second computing platform 204, at 702. The GACS 304 receives the first game state data 306 associated with the first video game application 302 executing at the first computing platform 202, at 704. The GACS 304 receives the second game state data 356 associated with the second video game application 352 executing at the second computing platform 204, at 706. The GACS 304 receives a request to display at the first computing platform 202 the first communication interface 310 of the GACS 304, at 708. The first communication interface 310 includes interactable graphical elements 320. The GACS 304 generates content for the first communication interface 310 to be displayed at the first computing platform 202, at 710. The content is generated base at least in part on the first game state data 306 or the second game state data 356. The content to be displayed includes the communication messages 322 corresponding to each of the interactable graphical elements 320. Each of the communication messages 322 comprises a function associated with the first video game application 302 or the second video game application 352. The GACS 304 causes to display the generated content via the first communication interface 310 of the first computing platform 202, at 712. The GACS 304 receives a selection of one of the communication messages 322 displayed via the first communication interface 310 of the first computing platform 202 to the transmit to the second computing platform 204, at 714. The GACS 304 transmits the selected communication message 322 to the second computing platform 204 for display via the second communication interface 360 of the GACS 304 at the second computing platform 204, at 716.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method of facilitating communication between computing platforms, the method including:

establishing, over a network and via a game agnostic communication service, communication with a first computing platform and a second computing platform;

receiving first game state data associated with a first video game application executing at the first computing platform;

receiving second game state data associated with a second video game application executing at the second computing platform;

receiving a request to display at the first computing platform a first communication interface of the game agnostic communication service, the first communication interface including one or more interactable graphical elements;

generating content for the first communication interface to be displayed at the first computing platform, the content being generated based at least in part on the first game state data or the second game state data, wherein the content to be displayed includes communication messages corresponding to each of the one or more interactable graphical elements, wherein each of the communication messages comprise a function associated with the first video game application or the second video game application;

causing to display the generated content via the first communication interface of the first computing platform, including causing the first communication interface to be displayed overlaying an online game interface of the first computing platform to provide an efficient use of memory at the first computing platform;

receiving a selection of one of the communication messages displayed via the first communication interface of the first computing platform to transmit to the second computing platform; and transmitting the selected communication message to the second computing platform for display via a second communication interface of the game agnostic communication service at the second computing platform.

2. The computer-implemented method of claim 1, wherein generating the content to be displayed is based at least in part on the type of platforms of the first computing platform and second computing platform.

3. The computer-implemented method of claim 1, wherein both the first video game application and the second video game application are of the same video game application.

4. The computer-implemented method of claim 1, wherein the first video game application is of a first type of video game application and the second video game application is of a second type of video game application differing from the first type of video game application.

5. The computer-implemented method of claim 1, further including:

translating the selected communication message from a first format associated with the first computing platform to a second format associated with the second computing platform; and displaying the translated selected communication message via the second communication interface of the second computing platform.

6. The computer-implemented method of claim 5, wherein translating the selected communication message includes translating the selected communication message based on one or more user settings of the second computing platform.

7. The computer-implemented method of claim 6, wherein the user settings include accessibility settings, language settings, or both.

8. The computer-implemented method of claim 1, wherein generating the content to be displayed is also based on one or more settings from at least the first video game application or the second video game application.

9. The computer-implemented method of claim 1, wherein the first computing platform is of a first type of gaming platform and the second computing platform is of a second type of gaming platform, the first type of gaming platform differing from the second type of gaming platform.

10. The computer-implemented method of claim 1, further including instantiating the first communication interface at the first computing platform by the first video game application.

11. A server computing system comprising a processor having access to memory media storing instructions executable by the processor to perform operations:

establishing, over a network and via a game agnostic communication service, communication with a first computing platform and a second computing platform;

receiving first game state data associated with a first video game application executing at the first computing platform;

receiving second game state data associated with a second video game application executing at the second computing platform;

receiving a request to display at the first computing platform a first communication interface of the game agnostic communication service, the first communication interface including one or more interactable graphical elements;

generating content for the first communication interface to be displayed at the first computing platform, the content being generated based at least in part on the first game state data or the second game state data, wherein the content to be displayed includes communication messages corresponding to each of the one or more interactable graphical elements, wherein each of the communication messages comprise a function associated with the first video game application or the second video game application;

causing to display the generated content via the first communication interface of the first computing platform, including causing the first communication interface to be displayed overlaying an online game interface of the first computing platform to provide an efficient use of memory at the first computing platform;

receiving a selection of one of the communication messages displayed via the first communication interface of the first computing platform to transmit to the second computing platform; and transmitting the selected communication message to the second computing platform for display via a second communication interface of the game agnostic communication service at the second computing platform.

12. The server computing system of claim 11, wherein generating the content to be displayed is based at least in part on the type of platforms of the first computing platform and second computing platform.

13. The server computing system of claim 11, wherein both the first video game application and the second video game application are of the same video game application.

14. The server computing system of claim 11, wherein the first video game application is of a first type of video game application and the second video game application is of a second type of video game application differing from the first type of video game application.

15. The server computing system of claim 11, the operations further including:

translating the selected communication message from a first format associated with the first computing platform to a second format associated with the second computing platform; and displaying the translated selected communication message via the second communication interface of the second computing platform.

16. The server computing system of claim 15, wherein translating the selected communication message includes translating the selected communication message based on one or more user settings of the second computing platform.

17. The server computing system of claim 16, wherein the user settings include accessibility settings, language settings, or both.

18. The server computing system of claim 11, wherein generating the content to be displayed is also based on one or more settings from at least the first video game application or the second video game application.

19. The server computing system of claim 11, wherein the first computing platform is of a first type of gaming platform and the second computing platform is of a second type of gaming platform, the first type of gaming platform differing from the second type of gaming platform.

20. A non-transitory computer-readable medium storing software comprising instructions executable by one or more computers which, upon such execution, cause the one or more computers to perform operations comprising:

establishing, over a network and via a game agnostic communication service, communication with a first computing platform and a second computing platform;

receiving first game state data associated with a first video game application executing at the first computing platform;

receiving second game state data associated with a second video game application executing at the second computing platform;

receiving a request to display at the first computing platform a first communication interface of the game agnostic communication service, the first communication interface including one or more interactable graphical elements;

generating content for the first communication interface to be displayed at the first computing platform, the content being generated based at least in part on the first game state data or the second game state data, wherein the content to be displayed includes communication messages corresponding to each of the one or more interactable graphical elements, wherein each of the communication messages comprise a function associated with the first video game application or the second video game application;

causing to display the generated content via the first communication interface of the first computing platform, including causing the first communication interface to be displayed overlaying an online game interface of the first computing platform to provide an efficient use of memory at the first computing platform;

receiving a selection of one of the communication messages displayed via the first communication interface of the first computing platform to transmit to the second computing platform; and transmitting the selected communication message to the second computing platform for display via a second communication interface of the game agnostic communication service at the second computing platform.

* * * * *